Sept. 28, 1965     W. W. BILLINGS     3,209,212

FREQUENCY RESPONSIVE CONTROL DEVICE

Filed Jan. 11, 1961

WITNESSES

INVENTOR
William W. Billings
BY
ATTORNEY

United States Patent Office 3,209,212
Patented Sept. 28, 1965

3,209,212
FREQUENCY RESPONSIVE CONTROL DEVICE
William W. Billings, Lima, Ohio, assignor to Westinghouse Electric Corporation, East Pittsburgh, Pa., a corporation of Pennsylvania
Filed Jan. 11, 1961, Ser. No. 82,023
6 Claims. (Cl. 317—147)

The present invention relates to frequency responsive control devices, and more particularly to a frequency sensitive circuit for actuating a control device in response to change in frequency of an alternating current line above or below a predetermined value.

While the usefulness of the invention is obviously not restricted to any specific application, it is especially useful in alternating current aircraft electrical systems. Such systems normally operate at a constant frequency but the frequency may sometimes vary from its nominal value, and protection must be provided against abnormally low frequency, since some loads supplied by the system may be damaged by low frequency, or may operate improperly at lower frequencies than they are designed for. Various types of under-frequency relays and protective devices have been used for this purpose and tuned circuits have usually been used to provide the necessary frequency sensitivity. Such circuits, however, are also affected by variations in the voltage applied to them, and since the voltage as well as the frequency of the alternating current system may vary considerably under some conditions, such devices do not have the desired accuracy and reliability.

In accordance with the present invention, a different type of frequency sensitive circuit is provided which utilizes the characteristics of a saturable reactor. If a reactor having a magnetic core of square-loop material with input and output windings has an alternating current voltage applied to the input winding, and if the core saturates during each half-cycle of the applied voltage, then the average half-wave voltage of the output winding is proportional to the frequency of the applied voltage. Furthermore, since the core saturates during each half-cycle, the average output voltage will not be affected by changes in the applied voltage.

It would appear therefore that such a device might be used directly as a frequency sensing device to provide an output voltage proportional to the frequency of the applied voltage. Such a reactor, however, is not satisfactory for use in this way because of certain practical difficulties. Since the voltage and frequency of the applied voltage may vary over a considerable range, it would be necessary to design the reactor so that the core saturates before the end of each half-cycle at the minimum expected line voltage and at a minimum frequency not greater than the frequency at which the control device is to operate. When the core is designed in this way, the output wave form at normal voltage and frequency is a badly chopped sine wave which has a low ratio of average to peak voltage, so that it is very difficult to filter to provide the necessary final output voltage for operating a control device or relay. Because of this difficulty, saturable reactors have not heretofore been considered satisfactory for use in frequency sensing circuits.

The principal object of the present invention is to provide a frequency responsive control device for responding to the frequency of an alternating current line which is not affected by variations in the line voltage so that it has high accuracy and reliability.

Another object of the invention is to provide a frequency responsive circuit for actuating a control device utilizing the characteristics of a saturable reactor to obtain the desired frequency sensitivity but without the disadvantages of such a device as outlined above.

A further object of the invention is to provide a frequency responsive circuit utilizing a saturable reactor in which a constant voltage applied to the input winding of the reactor from a separate source alternates at a rate equal to the frequency of the alternating current line to which the device is to respond, so that a square wave output is obtained which provides an output voltage of satisfactory characteristics to actuate a control device. In this way, a frequency sensitive circuit is provided which is unaffected by variations in the applied alternating current voltage, so that it has a high degree of accuracy, and which has the further advantage of utilizing only static components so that a device of small size and high reliability is obtained.

The invention will be more fully understood from the following detailed description, taken in connection with the accompanying drawing, in which.

Figure 1:
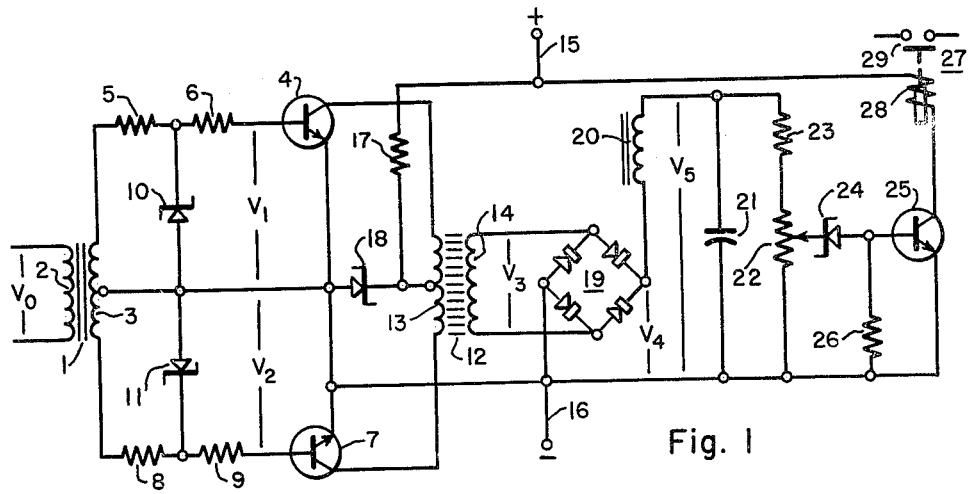
FIGURE 1 is a circuit diagram showing a preferred embodiment of the invention.

An illustrative embodiment of the invention is shown in the drawing. As shown in FIGURE 1, the frequency sensitive circuit is energized by a transformer 1 having a primary winding 2 and a center-tapped secondary winding 3. The primary winding 2 of the transformer 1 is connected to an alternating current line or circuit, the frequency of which is to be sensed. Thus, the transformer 1 may be connected from line to neutral of a three-phase system or it may be connected in any other desired manner to an alternating current line or circuit. A transistor 4 has its base connected through current limiting resistors 5 and 6 to one end of the secondary winding 3, and a second transistor 7 has its base connected through current limiting resistors 8 and 9 to the other end of secondary winding 3. The emitters of the transistors 4 and 7 are connected to the center tap of the secondary winding 3, and Zener diodes 10 and 11 are connected in opposite directions across the base and emitter of each of the transistors, as shown.

Figure 2:
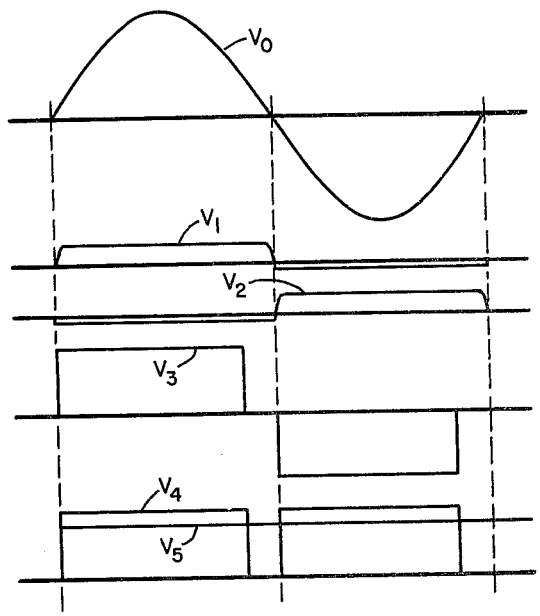
FIGURE 2 is a series of curves showing the voltages at various points in the circuit of FIGURE 1.

It will be seen that the voltages supplied by the transformer secondary winding 3 to the base circuits of the two transistors 4 and 7 will be displaced 180° from each other. Thus, on one half-cycle of the alternating current voltage applied to the transformer, a positive voltage will be applied to the base of transistor 4, while on the next half-cycle a positive voltage will be applied to the base of transistor 7. The transistors 4 and 7 are thus made conductive alternately on successive half-cycles, the base currents being limited by the resistors 6 and 9, respectively, while the Zener diodes 10 and 11 limit the positive voltages applied to the base circuits of the transistors. The diodes 10 and 11 preferably have a relatively low breakdown voltage, which may be of the order of one volt for example. Since the base threshold voltage of the transistors is quite low, the transistors are conductive for very nearly the full 180° of each positive half-cycle. On the negative half-cycles of each transistor base circuit, the transistor is non-conductive and the corresponding Zener diode conducts in its forward direction, the currents being limited by the resistors 5 and 8, respectively. This switching operation of the transistors 4 and 7 is illustrated in FIGURE 2 in which the voltage of the alternating current line applied to the primary of the transformer 1 is shown at $V_0$ and the base voltages of the transistors 4 and 7 are shown at $V_1$ and $V_2$, respectively, but on a much larger voltage scale.

Frequency sensitivity of the circuit is provided by means of a small saturable reactor 12. The reactor 12 has a magnetic core made of so-called square-loop material, that is, a magnetic material having a substantially rectangular hysteresis loop. The reactor 12 has an input winding 13 and an output winding 14 and the input winding 13 is center tapped, as shown. One end of the input winding 13 is connected to the collector of transistor 4 and the other end of the input winding 13 is connected to the collector of transistor 7. A suitable direct current supply is provided, as indicated by the positive and negative terminals 15 and 16, and the positive side of the direct current supply is connected through a resistor 17 to the center tap of the input winding 13. The emitters of transistors 4 and 7 are connected together and to the other side of the direct current supply as shown. A Zener diode 18 is connected across the direct current supply to maintain a substantially constant voltage on the input winding 13. The Zener diode 18 is selected to have a breakdown voltage less than the lowest voltage of the direct current supply, so that in normal operation it conducts in the reverse direction and provides a substantially constant voltage across the two halves of the input winding 13.

It will be seen that as the transistors 4 and 7 conduct alternately during successive half-cycles of the applied alternating current voltage, current will flow through the input winding 13 from the center tap first through one half of the winding 13 and the corresponding transistor and then in the opposite direction through the other half of the winding 13 and the transistor connected to it. In this way, the current in the input winding 13 of the reactor 12 is continuously reversed at a rate equal to the frequency of the alternating current voltage $V_0$. The alternating current voltage is thus not applied directly to the reactor 12 but is used to control the reversal of a substantially constant voltage applied to the input winding of the reactor. Since a substantially constant voltage is thus applied to the reactor during each half-cycle, the voltage $V_3$ of the output winding 14 is a square-wave voltage.

Figure 3:
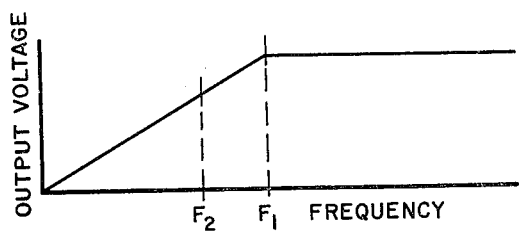
FIGURE 3 is a curve showing the relation of output voltage to the applied frequency.

The reactor 12 is designed so that it will just absorb 180° of the applied voltage each half-cycle at some frequency above the normal operating frequency, that is, if the nominal frequency of the alternating current line is 400 cycles per second, for example, the reactor 12 will be designed to saturate in exactly one-half cycle at some frequency greater than 400 cycles, such as the frequency $F_1$ of FIGURE 3. At any lower frequency, the core will saturate in less than a half-cycle and the voltage will drop substantially to zero before the end of the half-cycle, as illustrated by the output voltage $V_3$ in FIGURE 2. The average half-wave output voltage of the reactor 12 is linear with respect to the frequency, as shown in FIGURE 3, and the average half-wave output voltage can thus be used as an accurate indication of the frequency of the alternating current voltage $V_0$.

The output voltage $V_3$ of the saturable reactor 12 is rectified by means of a full-wave rectifier bridge 19 connected across the output winding 14. The output voltage $V_4$ of the rectifier bridge 19 is applied to a filter circuit, consisting of an inductor 20 and a capacitor 21, which provides a voltage $V_5$ equal to the average of the rectifier output voltage $V_4$ and thus equal to the half-wave average of the output voltage $V_3$ of the reactor 12. The output voltage $V_5$ of the filter circuit is the final output voltage of the frequency sensing circuit and, as previously explained, varies linearly with the frequency of the applied alternating current voltage $V_0$ and is accurately proportional to the frequency.

The output voltage $V_5$ may be utilized in any desired manner to actuate a control device when the frequency falls below some predetermined value. In the illustrative embodiment of the invention shown in FIGURE 1, the output voltage $V_5$ is applied to a potentiometer 22 which is connected across the filter circuit, preferably in series with a temperature-compensating resistor 23. The potentiometer 22 provides means for adjusting the operating point of the control device and it is connected through a Zener diode 24 to the base of a transistor 25. The emitter of the transistor 25 is connected to one side of the direct current supply, a resistor 26 preferably being connected across the base and emitter of the transistor 25. The control device to be actuated by the frequency responsive circuit is shown, for the purpose of illustration, as a relay 27 having an operating coil 28 connected between the collector of the transistor 25 and the other side of the direct current supply. The relay 27 has a contact 29 which may be connected to control a signal device, or to effect any desired control operation in response to underfrequency. It will be obvious that the relay 27 may have any desired number of contacts, or any necessary contact arrangement to perform the desired control functions. It will also be obvious that instead of a relay the control device might be any suitable type of static control device such as a controlled rectifier, a flip-flop circuit or any other suitable device.

The operation of the frequency responsive control device should now be apparent. As previously explained, the alternating current voltage applied to the transformer 1 causes the transistors 4 and 7 to conduct alternately on successive half-cycles. The transistors control the direction of current flow in the input winding 13 of the saturable reactor 12 so that the current reverses at a rate equal to the frequency of the alternating current voltage. The reactor saturates during each half-cycle of the applied voltage, as previously explained, and provides a square wave output voltage having a half-wave average value proportional to the frequency at all frequencies below the frequency $F_1$ which is selected to be above the normal operating range.

The rectified and filtered output voltage $V_5$ is applied through the Zener diode 24 to the base of transistor 25 and at all frequencies above the desired operating point, which may be some frequency such as that indicated at $F_2$ in FIGURE 3, the Zener diode 24 conducts and the transistor 25 has a positive signal applied to its base so that it is conductive and the relay 27 is energized. When the frequency falls below the desired operating point, the voltage applied to the Zener diode 24 falls below its breakdown value and the signal to the base of transistor 25 is cut off, making it non-conductive and deenergizing the relay 27. Thus operation of the control device is positively effected at the desired under-frequency. The operating point $F_2$ can be accurately adjusted by means of potentiometer 22 which adjusts the voltage applied to the Zener diode 24.

It will be apparent that the circuit could be used equally well to provide over-frequency operation, in which case the relay or control device 27 would normally be deenergized and would be energized when the transistor 25 is made conductive as the voltage $V_5$ rises above the value corresponding to the desired maximum frequency. The frequency sensitive circuit can obviously also be used in any other application where an accurate indication of frequency is required, or it could be utilized to measure frequency since the output voltage is accurately proportional to frequency over a considerable range.

It should now be apparent that a frequency responsive control circuit has been provided which has many advantages. This circuit is unaffected by variations in the applied voltage, since the applied alternating current voltage is used only to control the transistors which control the direction of current flow in the input winding of the saturable reactor, and thus is used only to sychronize the reversals of current in the input winding of the reactor. The Zener diode 18 provides a substantially constant voltage supply to the reactor, and thus the system is not affected by voltage variations of either the alternating current line or the direct current supply. By using the alternating current voltage only to synchronize the reversals of the input voltage to the reactor, an essentially square-wave input is obtained and a square-wave output results which has a half-wave average value accurately proportional to the frequency of the applied voltage and which has a satisfactory voltage level for actuation of a control device of any suitable kind. Thus, the frequency sensitivity of a saturable core is utilized in a very effective manner to obtain a frequency responsive circuit for actuating a control device.

The frequency sensitive circuit consists entirely of static devices which can be made of relatively small size and rugged construction so that a compact and highly reliable device is obtained which is particularly suitable for aircraft use where small size and high reliability are essential, although the circuit is obviously of general application and can be used wherever an accurate response to change in frequency above or below a predetermined value is required.

A particular embodiment of the invention has been shown and described for the purpose of illustration, but it will be apparent that various other modifications and embodiments are possible, and the invention is not limited to the particular details and circuit connections illustrated but in its broadest aspects it includes all equivalent embodiments and modifications.

I claim as my invention:

1. A frequency responsive circuit for responding to the frequency of an alternating current line, said circuit comprising a saturable reactor having input and output windings, means for applying a substantially constant direct current voltage to said input winding, semiconductor switching means for controlling the direction of current flow in the input winding, means for obtaining substantially constant control voltages from said line for controlling the semiconductor switching means, said semiconductor means being controlled solely in response to the polarity of the alternating current line to effect reversal of said current flow every half-cycle of the alternating current voltage, whereby the current flow in said input winding is substantially constant and is reversed at a rate equal to the frequency of the alternating current line, means for deriving an output voltage equal to the half-wave average voltage of the output winding, and control means responsive to said output voltage.

2. A frequency responsive circuit for responding to the frequency of an alternating current line, said circuit comprising a saturable reactor having input and output windings, means for supplying a substantially constant direct current voltage to the midpoint of said input winding, semiconductor switching devices connected to opposite ends of the input winding to control the flow of current therein, means for obtaining substantially constant control voltages from said line and applying said control voltages to the semiconductor switching devices to make the semiconductor devices fully conductive alternately on successive half-cycles of the voltage of said alternating current line, whereby the current flow in the input winding is substantially constant and is reversed at a rate equal to the frequency of the alternating current line, means for deriving an output voltage equal to the half-wave average voltage of the output winding, and control means responsive to said output voltage.

3. A frequency responsive circuit for responding to the frequency of an alternating current line, said circuit comprising a saturable reactor having input and output windings, means for supplying a substantially constant direct current voltage to the midpoint of said input winding, semiconductor switching devices connected to opposite ends of the input winding to control the flow of current therein, means for obtaining substantially constant control voltages from said line and applying said control voltages to the semiconductor switching devices to make the semiconductor devices fully conductive alternately on successive half-cycles of the voltage of said alternating current line, whereby the current flow in the input winding is substantially constant and is reversed at a rate equal to the frequency of the alternating current line, rectifier means connected to said output winding, means for deriving an output voltage equal to the average direct current voltage of the rectifier means, and control means responsive to said output voltage.

4. A frequency responsive circuit for responding to the frequency of an alternating current line, said circuit comprising a saturable reactor having input and output windings, means for supplying a substantially constant direct current voltage to the midpoint of said input winding, semiconductor switching devices connected to opposite ends of the input winding to control the flow of current therein, means for obtaining substantially constant control voltages from said line and applying said control voltages to the semiconductor switching devices to make the semiconductor devices fully conductive alternately on successive half-cycles of the voltage of said alternating current line, whereby the current flow in the input winding is substantially constant and is reversed at a rate equal to the frequency of the alternating current line, full wave rectifier means connected to said output winding, filter means for deriving an output voltage equal to the average direct current voltage of the rectifier means, and control means responsive to said output voltage.

5. A frequency responsive circuit for responding to the frequency of an alternating current line, said circuit comprising a saturable reactor having input and output windings, means for applying a substantially constant direct current voltage to said input winding, semiconductor switching means for reversing the direction of current flow in the input winding, means for obtaining substantially constant control voltages from said line for controlling said semiconductor switching means to obtain a substantially constant current in the input winding which reverses in direction at a rate equal to the frequency of the line, and means for deriving an output voltage equal to the half-wave average voltage of the output winding of the saturable reactor.

6. A frequency responsive circuit for responding to the frequency of an alternating current line, said circuit comprising a saturable reactor having input and output windings, means for applying a substantially constant direct current voltage to said input winding, semiconductor switching means for reversing the direction of current flow in the input winding, means for obtaining substantially constant control voltages from said line for controlling said semiconductor switching means to obtain a substantially constant current in the input winding which reverses in direction at a rate equal to the frequency of the line, said reactor being adapted to saturate within one half-cycle of the frequency of said line at frequencies below a predetermined frequency, and means for rectifying and filtering the voltage of the output winding of the reactor to obtain an output voltage equal to the half-wave average voltage of the output winding, said output voltage being proportional to the frequency of the line at frequencies below said predetermined frequency.

References Cited by the Examiner

UNITED STATES PATENTS

| 2,924,726 | 2/60 | Reuther | 317—151 |
|---|---|---|---|
| 2,947,863 | 8/60 | Buie | 317—147 |
| 2,968,738 | 1/61 | Pintell | 321—2 X |
| 3,004,220 | 10/61 | Williamson | 324—78 |
| 3,018,381 | 1/62 | Carroll et al. | 321—45 |
| 3,021,480 | 2/62 | Nye | 307—88.5 X |
| 3,068,420 | 12/62 | Smith | 329—103 |
| 3,069,558 | 12/62 | Burt et al. | 317—147 |

OTHER REFERENCES

Hamlin: "Transistor Power Converters," CQ, May 1958, pages 42, 43.

SAMUEL BERNSTEIN, *Primary Examiner.*